3,146,451
DIELECTRIC LENS GIVING PERFECT FOCAL
POINTS AT SELECTED DISTANCE OFF-AXIS
Robert L. Sternberg, Chestnut Hill, Mass., assignor to
Laboratories for Electronics, Inc., Boston, Mass., a corporation of Delaware
Filed Oct. 29, 1956, Ser. No. 619,917
10 Claims. (Cl. 343—753)

The present invention relates in general to lenses and in particular to a microwave dielectric lens which has the property of focusing microwave energy emanating from a plurality of off-axis focal points into respective collimated beams angularly oriented relative to the lens axis. A lens of the type described herein is especially advantageous for use in airborne radar systems where compactness and minimum weight are principal requirements. For example, such use is described in the copending application of Maurice A. Meyer, entitled Doppler Radar System, Serial No. 610,444, filed September 10, 1956, now Patent No. 3,102,263.

A detailed discussion of the principles of the present invention and uses thereof appears in a paper by Robert L. Sternberg entitled Successive Approximation and Expansion Methods in the Numerical Design of Microwave Dielectric Lenses, on page 209 of the January 1956 "Journal of Mathematics and Physics," portions of which are reproduced below.

An object of the invention is the provision of a lens which focuses rays emanating from a plurality of off-axis focal points into respective beams of parallel rays angularly oriented relative to the lens axis.

Another object of the invention is the provision of a lens having non-spherical surfaces of different curvature which control substantially any selected number, or more generally, all of the rays emanating from a focal point source in accordance with the preceding object.

Still a further object of the invention is the utilization of dielectric material for the focusing of microwave energy emanating from a plurality of focal point sources in accordance with the preceding object.

Still another object of the invention is the provision of a lightweight zoned microwave dielectric lens having the focusing properties described in the preceding object.

Another object of the invention is the provision of a microwave dielectric lens having the desired focusing properties described above and having the maximum number of zones which may be used for the wavelength of the microwave energy to be focused.

Another object of the invention is the provision of a microwave dielectric lens having the focusing properties set forth above with respect to an off-axis focal point extremely close to the lens surface, thereby facilitating the provision of a compact microwave radiating system. That is to say, the desired lens has the focusing properties set forth above, combined with an extremely low $f$-number.

Another object of the invention is the provision of a lens having the desirable properties enumerated above in a form whereby for a given aperture the lens occupies a minimum volume, and for a given volume the lens aperture is a maximum.

Broadly speaking, the novel lens is axially symmetric and has a cross-section in a meridional plane which includes the lens axis, bounded by circular and quartic arcs respectively. A quartic arc is a portion of a curve expressable in a two coordinate system wherein the dependent variable is proportional to a fourth degree polynomial in the independent variable.

In another aspect of the invention, the novel axially symmetric lens has a cross-section which is bounded by curves of even, equal and greater than second degree and of different curvature. By curves of even, equal and greater than second degree, it is meant that in the equation defining each curve, the dependent variable is related to the independent variable by a finite geometric series or a polynomial of degree $2N+2$ where N is a positive integer, N being the same for each curve.

A more particular characteristic of the novel lens is that the dimensions and index of refraction of the lens are such that rays emanating from on off-axis lens focal point emerge therefrom as substantially parallel rays angularly oriented relative to the lens axis. In accordance with other aspects of the invention, the number of rays which may be controlled exactly in this manner and the extent to which all of them may be controlled approximately is related to the degree of the curves defining the lens surfaces and having constants as described in detail below. In general, the shorter the focal length or lower the $f$-number of the lens, the higher is the degree of the lens surfaces to produce the desired focusing.

Another form the invention takes is that of a zoned microwave dielectric lens, each zone having a cross-section bounded by curves as indicated above. Preferably, the maximum number of zones are utilized for a selected lens diameter, wavelength, parallel ray angular orientation, focal length and dielectric material, thereby reducing the weight of the lens for attaining the desired result.

Other features, objects, advantages and more particular aspects of the invention will be better understood from the following specification when read in connection with the accompanying drawing in which:

FIG. 1 illustrates a cross-section of a triple zone lens;

1. *Introduction*

In the discussion which follows, it is convenient to divide the description into sections. Thus, in Section 2 there is a formulation of a specific problem whose solution is met by the novel lens structures. Section 3 then describes a solution for the zone extremities of a zoned microwave lens in terms of the focal length, lens diameter, wavelength, selected angle between the emitted parallel rays, and the lens axis, and the number of zones. Section 4 describes a first approximate solution for the lens surfaces, and Sections 5 and 6 describe exact solutions therefor. Section 7 concludes with a discussion of practical aspects of the lens.

2. *Formulation of the Problem*

Figure 2:
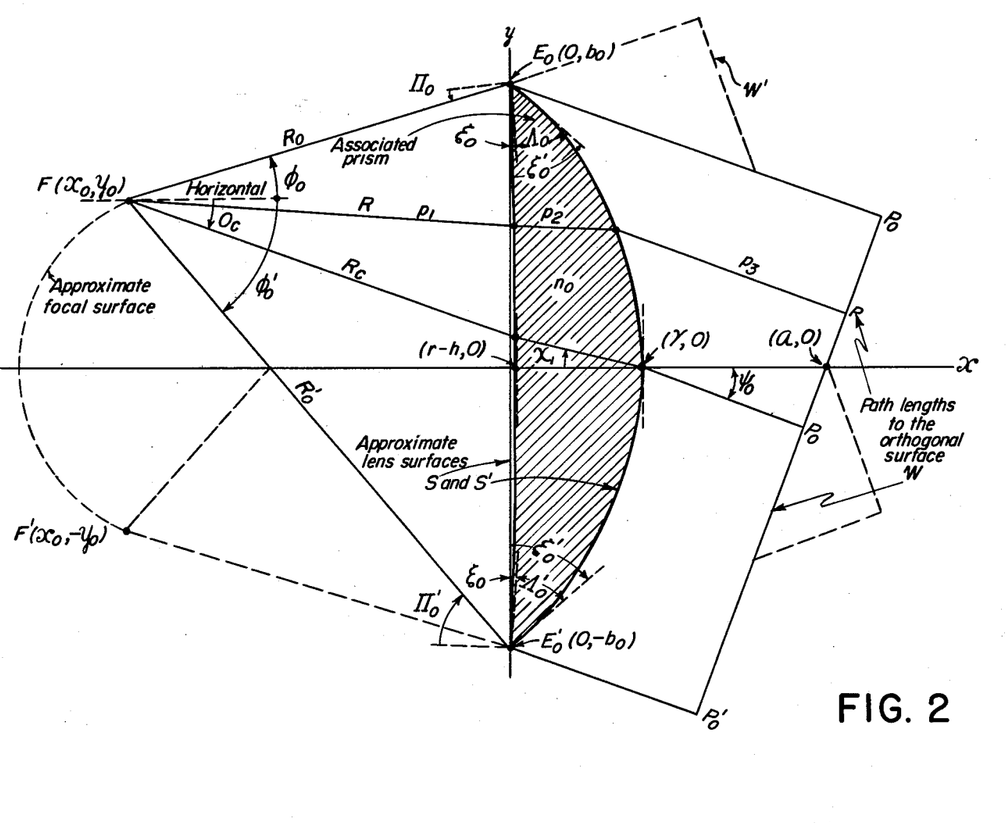
FIG. 2 illustrates a cross-section of a single lens bounded by circular and quartic arcs.

It is desired to numerically design a microwave dielectric lens of revolution of the type shown in FIG. 1 or 2 having, with respect to meridional rays only, four perfect focal points, two finite, F and F', and two infinite, $F_\infty$ and $F'_\infty$, pairwise symmetrically displaced in the meridional plane about the axis of symmetry of the lens when, as indicated in FIG. 1, the optional requirement of zoning may be included and when, moreover, the five parameters (2.1) $\quad n_0, 2b_0, |x_0|, \psi_0$ and $\lambda_0$ i.e., the refractive index of the lens $n_0$, the diameter of the lens $2b_0$, the normal distance $|x_0|$ to the finite focal points F and F', the off axis angle $\psi_0$ to the infinite focal points $F_\infty$ and $F'_\infty$ and the wave length of the incident radiation $\lambda_0$, are all given positive numbers. Let the lens surfacs S and S' be required to be concurrent in the meridional plane at two symmetrically placed points $E_0$ and $E'_0$ called the lens extremities and optionally, again at certain symmetrically placed points $E_k$ and $E'_k$ for $(K=1, 2, \ldots N)$ called the zone extremities, where generally these points mark the ends of the relevant meridional diameter of the lens or zone. Finally, let the lens extremities $E_0$ and $E'_0$ lie on the $y$-axis and take the axis of symmetry of the lens along the $x$-axis in FIGS. 1 and 2. Aside from the matter of the determination of the locations of the finite focal points F and F', a solution of the problem including the zoning for an $N+1$-tuple maximally zoned lens then requires the determination in the meridional plane of the locations of the zone extremities $E_k$ and $E'_k$ for $(k=1, 2, \ldots, N)$ as above together with the determination in the meridional plane of the equations of the lens surfaces S and S' for each zone satisfying the required symmetry conditions and so forth about the $x$-axis and such that all meridional rays from the finite focal points F and F' incident upon the lens, when refracted in accordance with Snell's law, emerge from the lens at the appropriate given angle $\psi = \pm \psi_0$ from the $x$-axis while the phase is constant along any orthogonal surfaces W and W'. In the foregoing we understand those meridional rays from F and F' which ultimately intersect a zone step to be omitted from consideration and we especially demand that the lens surfaces S and S' come together sharply at the lens and zone extremities as part of the problem.

By the theorem of Malus the requirement that all of the incident meridional rays from F and F' emerge from the lens in the two directions $\psi = \pm \psi_0$ respectively, and thereby form in the meridional plane two parallel ray beams, amounts to the equivalent condition that the optical path lengths (2.2) $\quad P \equiv p_1 + n_0 p_2 + p_3, \ P' \equiv p'_1 + n_0 p'_2 + p'_3$ associated with variable meridional rays R and R' from F and F' as in FIGS. 1 and 2 be constant along the orthogonal surfaces W and W' for each zone whence, by the requirement of constant phase along W and W', it follows that the optical path lengths P and P' in (2.2) must change only by integral multiples of $\lambda_0$ from zone to zone. Imposing the condition of equal path lengths just noted on the extremal rays $R_0$ and $R'_0$ from the focus F which pass through the lens extremities $E_0$ and $E'_0$ to the orthogonal surface W, the necessary and sufficient condition for equality of the optical path lengths $P_0$ and $P'_0$ in question associated with $R_0$ and $R'_0$, is that F be located on the upper branch of the hyperbola (2.3) $\quad (y^2/b^2_0) \sin^2 \psi_0 - (x^2/b^2_0 \cos^2 \psi_0) = 1$ which has a geometrical foci the lens extremities $E_0$ and $E'_0$ and as asymptotes the lines $y = \pm x \tan \psi_0$. By symmetry, F' is located on the lower branch of the hyperbola (2.3). Finally, the focal distance $|x_0|$ being preassigned, the coordinates of the foci F and F' are (2.4) $\quad F, F': x_0 = -|x_0|, \ y_0 = \pm [b^2_0 + x^2_0 \sec^2 \psi]^{\frac{1}{2}} \sin \psi_0$ where $2b_0$, $|x_0|$ and $\psi_0$ are the given parameters (2.1).

The focal points F and F' thus have been uniquely determined whence it is desired to find the coordinates of the zone extremities $E_k$ and $E'_k$ for $(k=1, 2, \ldots, N)$ and the equations of the lens surfaces S and S' for each zone.

3. Solution for the Zone Extremities

After locating the foci F and F' in the manner already described, the first step in the design of an $N+1$-tuple maximally zoned lens of revolution is the determination in the meridional plane of the locations of the zone extremities (3.1) $\quad E_1(a_1, b_1), \ E'_1(a_1, -b_1), \ldots,$
$$E_N(a_N, b_N), \ E'_N(a_N, -b_N)$$

at which the lens surfaces S and S' are to come together sharply while also satisfying the required symmetry conditions about the $x$-axis as in FIG. 1. This assumes of course that the lens is to be zoned; in actual practice the decision as to whether or not zoning is to be employed and if so to what extent, will depend generally on the application for which the lens is intended and upon the values of the last four of the five given parameters (2.1) with the maximum number of possible zones in addition to the zeroth or outer zone, being a uniquely determined integer $N = N(2b_0, |x_0|, \psi_0, \lambda_0) \geq 0$.

Assuming the lens is to be zoned as many times as possible to form an $N+1$-tuple maximally zoned lens, an analytic determination will be made in the meridional plane of the coordinates of the zone extremities $E_k$ and $E'_k$ for $(k=1, 2, \ldots, N)$ in (3.1) where the integer $N = N(2b_0, |x_0|, \psi_0, \lambda_0) \geq 0$ will be determined in the process and wherein by symmetry only radiation from the focus F need be considered. To this end the condition of equal path lengths previously mentioned is imposed on the meridional rays $R_k$ and $R'_k$ for $(k=1, 2, \ldots, N)$ from the focus F which pass through the zone extremities to be determined as shown in FIG. 1. It is required that the optical path lengths $P_k$ and $P'_k$ measured along those rays from the focus F through the zone extremities $E_k$ and $E'_k$ for $(k=1, 2, \ldots, N)$ to the orthogonal surface W be pairwise equal and have the common values (3.2) $\quad P_k = P_0 - k\lambda_0, \ P'_k = P'_0 - k\lambda_0 \ (k=1, 2, \ldots, N)$ where as before $P_0$ and $P'_0 = P_0$ denote the optical path lengths along the extremal rays $R_0$ and $R'_0$ from the focus F. A ready calculation of $P_0$ and $P'_0 = P_0$ yields the common formula (3.3) $\quad P_0 = P'_0 = [b^2_0 + x^2_0 \sec^2 \psi_0]^{\frac{1}{2}} + a \cos \psi_0$ where $a$ is $x$-axis intercept of the orthogonal surface W. Proceeding, the necessary and sufficient condition that the optical path lengths $P_k$ and $P'_k$ be given by formulas (3.2) is next noted to be the condition that the coordinates of the $k$th zone extremities $E_k$ and $E'_k$ in (3.1) satisfy the equations $$P_k \equiv [(x_0 - a_k)^2 + (y_0 - b_k)^2]^{1/2}$$
$$+ (a - a_k) \cos \psi_0 + b_k \sin \psi_0 = P_0 - k\lambda_0$$
$$(k=1, 2, \ldots, N)$$

(3.4)
$$P'_k \equiv [(x_0 - a_k)^2 + (y_0 + b_k)^2]^{1/2}$$
$$+ (a - a_k) \cos \psi_0 - b_k \sin \psi_0 = P'_0 - k\lambda_0$$

where $x_0$ and $y_0$ are the coordinates of the focus F in (2.4) and $a$ is the $x$-axis intercept of the orthogonal surface W. Transposing, squaring, subtracting and adding these equations using the relation $P'_0 = P_0$, $$a_k = a - (P_0 - k\lambda_0) \sec \psi_0 + y_0 \sec \psi_0 \csc \psi_0$$
(3.5) $\quad\quad\quad\quad\quad\quad (k=1, 2, \ldots, N)$
$$b_k = [(P_0 - k\lambda_0 - (a - a_k) \cos \psi_0)^2 - (x_0 - a_k)^2 - y^2_0]^{1/2} \sec \psi_0$$

which then may be further simplified by use of relations (2.4) and (3.3). In this way, the formulas $$a_k = k\lambda_0 \sec \psi_0$$
(3.6) $\quad\quad\quad\quad\quad\quad (k=1, 2, \ldots, N)$
$$b_k = [b^2_0 - 2k\lambda_0 |x_0| \sec^3 \psi_0 - k^2 \lambda^2_0 \sec^4 \psi_0]^{1/2}$$

are obtained for the coordinates of the $k$th zone extremities $E_k$ and $E'_k$ in (3.1) in terms of the given parameters $2b_0$, $|x_0|$, $\psi_0$ and $\lambda_0$ in (2.1) where the integer $N = N(2b_0,$ $|x_0|$, $\psi_0$, $\lambda_0) \geqq 0$ thus also has been uniquely determined; in fact, regarding the latter, we have that $N=N(2b_0, |x_0|, \psi_0, \lambda_0) \geqq 0$ must be in the largest non-negative integer satisfying the inequality (3.7) $\quad b^2{}_0 - 2N\lambda_0 |x_0| \sec^3 \psi_0 - N^2\lambda^2{}_0 \sec^4 \psi_0 > 0$ or such that the coordinates $b_k$ for $(k=1, 2, \ldots, N)$ are real and positive. This completes the determination of the locations of the zone extremities (3.1).

The solution of the first part of the problem as given by formulas (3.6) and (3.7) thus has been effected exactly and uniquely except for the previously mentioned somewhat arbitrary choice of whether or not the lens is to be zoned as many times as possible or a lesser number of times. In the event of the latter only a subset of the points (3.1) are used as zone extremities and the lens surfaces S and S' may be extended over the omitted zones in question along surfaces such as those indicated by the dashed lines in FIG. 1.

4. A First Approximate Solution for the Lens Surfaces

The fundamental question of the determination in the meridional plane of the equations of the lens surfaces S and S' for either a zoned or unzoned lens of revolution satisfying the required symmetry conditions about the x-axis will be considered. To begin with, it follows from the considerations of Sections 2 and 3 that the problems of determining the lens surfaces S and S' for the several separate zones of a zoned lens, or for the single lens section of an unzoned lens, are essentially the same once the foci F and F' have been located as in Section 2 and the zone extremities $E_k$ and $E'_k$ for $(k=1, 2 \ldots, N)$, in the case of a zoned lens, have been located as in Section 3, the individual zones of a zoned lens for this purpose being considered to be each a part of a complete lens section as indicated by the dashed lines in FIG. 1. In actual practice it will be found that the specification of the lens surfaces S and S' for the outer zones of a given zoned lens will be generally a more critical matter than that for the inner zones of the same lens but the principles in question are nevertheless essentially the same.

Therefore, the problem of determining in the meridional plane the solution for the lens surfaces S and S' for the single lens section associated with the zeroth or outer zone of the zoned lens of FIG. 1, redrawn in FIG. 2 is considered and in this section a first approximate solution is given for S and S' in the algebraic forms (4.1) $\quad$ S: $(x+h)^2+y^2=r^2$, S': $x=\alpha y^4+\beta y^2+\gamma$ where the coefficients $r$, $h$, $\alpha$, $\beta$ and $\gamma$ thus are to be found. It is required that the two extremal rays $R_0$ and $R'_0$ through $E_0$ and $E'_0$ to the orthogonal surface W be controlled perfectly in emergent direction $\psi$ and optical path length P while the central meridional ray $R_c$ is controlled approximately with respect to $\psi$ and P as shown in FIG. 2 where again by symmetry we need consider only radiation from the focus F.

Figure 3:
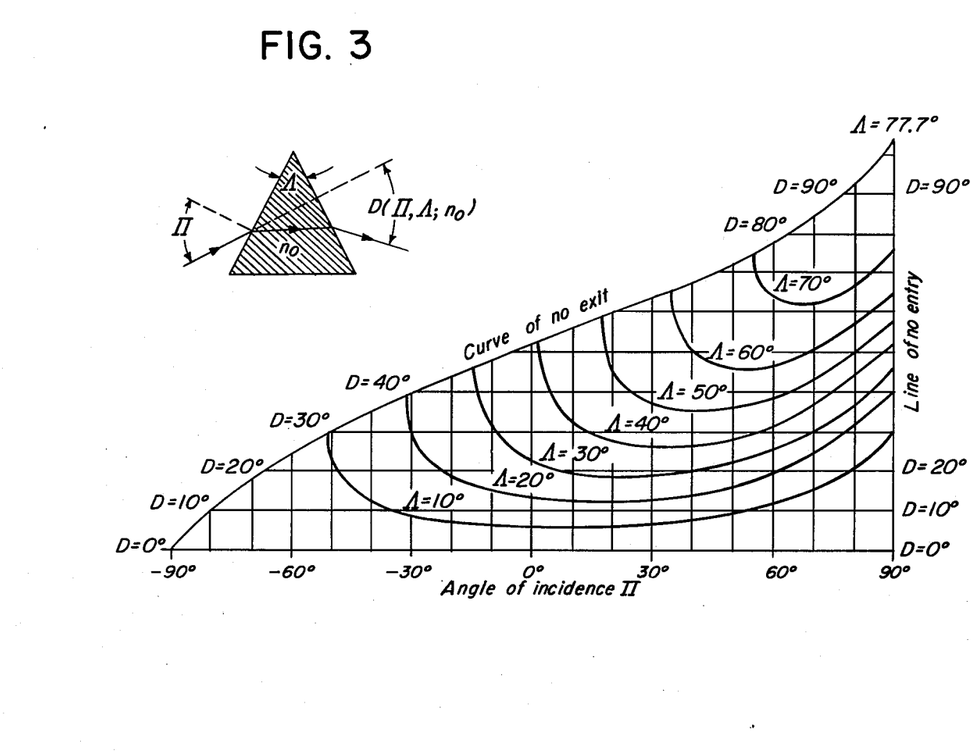
FIG. 3 is useful for graphically determining the solutions of the prism equations when determining the lens surfaces.

The first step in the approximate solution for the lens surfaces S and S' in the forms (4.1) is the determination in the meridional plane of the direction or slope angles $\xi_0$ and $\xi'_0$ of these surfaces at the lens extremities $E_0$ and $E'_0$ in such a way that the extremal rays $R_0$ and $R'_0$ are bent just enough as in FIG. 2 so as to emerge at the given angle $\psi=\psi_0$ exactly, the location (2.4) of the focus F being already such that the optical path lengths $P_0$ and $P'_0$ along $R_0$ and $R'_0$ are then equal. Let these slope angles $\xi_0$ and $\xi'_0$ be defined as in FIG. 2 and let them be measured positively in the directions shown so that the corresponding angles of incidence of $R_0$ and $R'_0$ on S are $\Pi_0=\phi_0-\xi_0$ and $\Pi'_0=\phi'_0-\xi_0$ as illustrated where $\phi_0$ and $\phi'_0$ are the angles of inclination (4.2) $\quad \phi_0=\tan^{-1} [(b_0-y_0)/|x_0|]$,
$\phi'_0=\tan^{-1} [(b_0+y_0)/|x_0|]$ associated with $R_0$ and $R'_0$ at the focus F. To facilitate the determination it is convenient to associate prisms of angles $\Lambda_0=\xi'_0-\xi_0$ and $\Lambda'_0=\xi_0-\xi_0$ with $R_0$ and $R'_0$ at $E_0$ and $E'_0$ as in FIG. 2. Next it is convenient to introduce the concept of the prism function (4.3) $\quad D(\Pi, \Lambda; n_0) = \Pi - \Lambda + \sin^{-1}$
$[(n^2{}_0 - \sin^2 \Pi)^{\frac{1}{2}} \sin \Lambda - \sin \Pi \cos \Lambda]$ which is defined as the deviation $D(\Pi, \Lambda; n_0)$ of a principal section ray incident at angle $\Pi$ on the surface of a prism of angle $\Lambda$ and index of refraction $n_0$ and wherein the angle of incidence $\Pi$ is positive when, in the principal section, the incident ray and the vertex of the prism are on opposite sides of the normal to the prism surface. The region of definition of the function $D(\Pi, \Lambda; n_0)$ is characterized by the inequalities (4.4) $\quad |\Pi|<\frac{1}{2}\pi$, $|(n^2{}_0 - \sin^2 \Pi)^{\frac{1}{2}} \sin \Lambda - \sin \Pi \cos \Lambda|<1$ while a set of graphs of the function for fixed values of $\Lambda$ and $n_0=1.594$ together with a principal section sketch of the defining prism and ray appears in FIG. 3. Applying the foregoing concept of the prism function $D(\Pi, \Lambda; n_0)$ to the prisms of angles $\Lambda=\xi'_0-\xi_0$ and $\Lambda'_0=\xi'_0-\xi_0$ associated with $R_0$ and $R'_0$ at $E_0$ and $E'_0$ as described, the necessary and sufficient conditions for the determination of the slope angles $\xi_0$ and $\xi'_0$ of the lens surfaces S and S' at $E_0$ and $E'_0$ are that these signals satisfy the prism equations (4.5) $\quad D(\phi_0-\xi_0, \xi'_0-\xi_0; n_0)=\phi_0+\psi_0$
$D(\phi'_0-\xi_0, \xi'_0-\xi_0; n_0)=\phi'_0-\psi_0$ where $\phi_0$ and $\phi'_0$ are given by (4.2). These equations may be solved readily to any desired accuracy by graphical means starting with a set of curves of the function $D(\Pi, \Lambda; n_0)$ such as those shown in FIG. 3 for $n_0=1.594$ and thence successively magnifying the graphs in a neighborhood of each approximation to the roots $\xi_0$ and $\xi'_0$ before proceeding to the next better approximation while the existence and uniqueness of the solution for $\xi_0$ and $\xi'_0$ may be settled likewise provided only that the first four of the five given parameters (2.1) have been confined originally to a suitable non-critical open region essentially determined by the inequalities (4.4), e.g., as mentioned in Section 2, provided only that for given values of $n_0$ and $\psi_0$ the ratio $F=|x_0|/2b_0$ has not been taken excessively small.

Assuming a solution for the slope angles $\xi_0$ and $\xi'_0$ of the lens surfaces S and S' at $E_0$ and $E'_0$ in the prism equations (4.5) has been found, the quantities $r$ and $h$ in the approximate solution (4.1) for S and S' are completely determined and, in fact, have the values (4.6) $\quad r=b_0 \csc \xi_0, \quad h=b_0 \cot \xi_0$ while the coefficients $\alpha$, $\beta$ and $\gamma$ in (4.1) are determined to the extent that the equations (4.7) $\quad b^4{}_0 \alpha + b^2{}_0 \beta + \gamma = 0, \quad 4b^3{}_0 \alpha + 2b_0 \beta + \tan \xi'_0 = 0$ must hold. To complete the determination of $\alpha$, $\beta$ and $\gamma$ in (4.1) a third relation is required. To this end there is imposed a partial control of the behavior of the central meridional ray $R_c$ in FIG. 2 by supposing as an approximation that the lens surface S and S' are planar and parallel in a neighborhood of the lens center and by requiring, under the foregoing supposition, that the central meridional ray $R_c$ be controlled perfectly. Let $R_c$ emanate from the focus F at an angle of inclination $\phi_c=\psi_0$ and let the planar approximations to the lens surfaces in the neighborhood of the lens center have equations of the form (4.8) $\quad$ S: $x=r-h$, S': $x=\gamma$ where $r$ and $h$ are given by (4.6) and $\gamma$ is to be determined. Under these assumptions $R_c$ will emerge from the lens at the angle $\psi=\psi_0$ with the x-axis and, imposing the condition that the optical path length P in (2.2) shall have the value $P_0$ calculated in (3.3) for $R_0$ and $R'_0$, there as follows the equation (4.9) $P \equiv |x_0| \cos \psi_0 + y_0 \sin \psi_0 + \alpha \cos \psi_0$
$+ [(\gamma - r + h) \sec \chi_C] \cdot [n_0 - \cos(\psi_0 - \chi_C)] = P_0$ for $\gamma$ where $a$ is the $x$-axis intercept of the orthogonal surface W and where $\chi_C$ is the angle between $R_c$ and the $x$-axis within the lens and is defined in accordance with Snell's law by the relation $\sin \chi_C = (1/n_0) \sin \psi_0$. Solving (4.9) for $\gamma$ and substituting from (2.4), (3.3) and (4.6) for $y_0$, $P_0$, $r$ and $h$, (4.10) $\gamma = b_0[\csc \xi_0 - \cot \xi_0]$
$+ [(b^2_0 + x^2_0 \sec^2 \psi_0)^{1/2} \cos \psi_0 - |x_0|]$
$\cdot [(\cos \psi_0 \cos \chi_C)/(n_0 - \cos(\psi_0 - \chi_C))]$ where as before $\sin \chi_C = (1/n_0) \sin \psi_0$. Substituting the value (4.10) for $\gamma$ in the equations (4.7) $\alpha$ and $\beta$ may be solved in the forms (4.11) $\alpha = (\gamma/b^4_0) - (\frac{1}{2}b^3_0) \tan \xi'_0$ $\beta = (\frac{1}{2}b_0) \tan \xi'_0 - (2\gamma/b^2_0)$ thus completing the approximate solution for the lens surfaces in the forms (4.1).

In the first approximate solution for the lens surfaces S and S' just derived the two extremal rays $R_0$ and $R'_0$ have been controlled perfectly and a third meridional ray, the central ray $R_c$ has been controlled to the extent to which the planar approximation (4.8) is valid for the actual lens surfaces S and S' ultimately defined by the equations (4.1) while the remaining continuum of meridional rays from the focus F which lie between $R_0$, $R_c$ and $R'_0$ have been left uncontrolled. Although this first approximate solution for the lens surfaces appears quite crude it has been found, nevertheless, to be extremely useful in practice at the index of refraction $n_0 = 1.594$ for the design of polystyrene lenses with $\psi \leq \pi/9$ and with ratios $F = |x_0|/2b_0 \geq 1$ and $G = \lambda_0/2b_0 \geq 1/50$. In the following two sections, two essentially complete formal solutions are given for the lens surfaces by infinite processes which presumably converge to exact solutions of our problem whenever such exist and which, therefore, may be applied to those lens design problems having more critical values of the ratios $F = |x_0|/2b_0$ and $G = \lambda_0/2b_0$.

5. Formal Solution for the Lens Surfaces by Successive Approximations

Along with the assumption that there exists one set of exact lens surfaces S and S' satisfying the requirements of the problem for a suitable choice of given parameters (2.1) let is now be assumed that these exact lens surfaces are representable in the meridional plane by power series expansions of the forms (5.1)
S: $x = \alpha_0 + \alpha_1 y^2 + \alpha_2 y^4 + \ldots + \alpha_M y^{2M} + \ldots$ S': $x = \alpha'_0 + \alpha'_1 y^2 + \alpha'_2 y^4 + \ldots + \alpha'_M y^{2M} + \ldots$ where these series are assumed uniformly convergent for $|y| \leq b_0$, contain even terms only and thus define symmetric contours about the $x$-axis. Motivated by these assumptions let sequences of surfaces $S_N$ and $S'_N$ representable in the meridional plane by polynomials of the forms $S_N$: $x = \beta_0(N) + \beta_1(N)y^2 + \beta_2(N)y^4 + \ldots$
(5.2) $+ \beta_M(N)y^{2M}$ $(N = 1, 2, \ldots; M = 2N+1)$ $S'_N$: $x = \beta'_0(N) + \beta'_1(N)y^2 + \beta'_2(N)y^4 + \ldots + \beta'_M(N)y^{2M}$ be called sequences of Nth approximates to the exact lens surfaces S and S' or sequences of approximate lens surfaces $S_N$ and $S'_N$ if each such pair of surfaces $S_N$ and $S'_N$ passes through the lens extremities $E_0$ and $E'_0$ and if each approximate lens defined by each such pair of surfaces $S_N$ and $S'_N$ controls perfectly with respect to emergent ray angle $\psi$ and optical path length P a set of $2N+2$ meridional rays $R_0$, $R'_0$, $R_{Nj}$ and $R'_{Nj}$ for $(j=1, 2, \ldots, N)$ from the focus F including, in particular, the extremal rays $R_0$ and $R'_0$ through $E_0$ and $E'_0$ from F as in FIG. 4.

By reasons of symmetry each such approximate lens then also will control perfectly a corresponding set of $2N+2$ meridional rays from the focus F'. Finally, let it be assumed that all such sequences of approximate lens surfaces $S_N$ and $S'_N$ converge in the meridional plane to the exact lens surfaces S and S' uniformly for $|y| \leq b_0$, whence the solution of the problem may be had without actually developing the exact lens surfaces S and S' in the series forms assumed.

Figure 4:
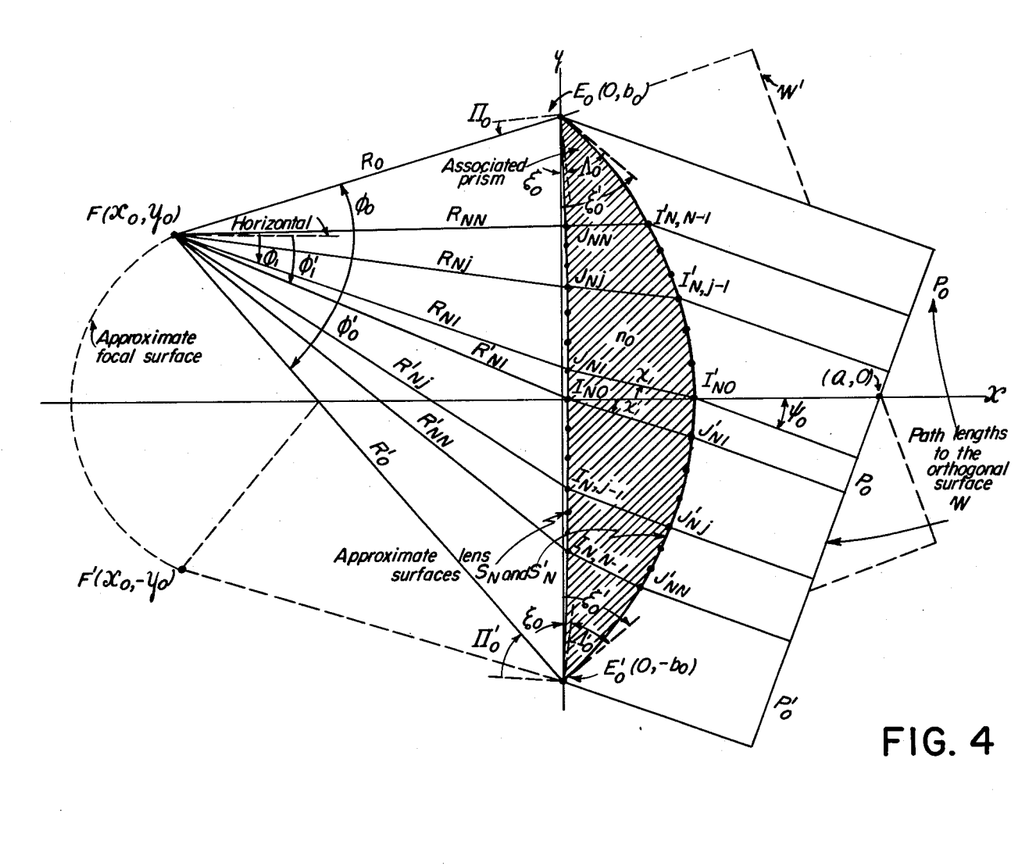
FIG. 4 is a cross-section of a single lens section helpful in understanding the determination of the lens surfaces when utilizing the method of successive approximations.

To effect the formal solution for a set of approximate lens surfaces $S_N$ and $S'_N$ as in (5.2) or, more particularly, the solution for their coefficients $\beta_i = \beta_i(N)$ and $\beta'_i = \beta_i(N)$ for $(i = 0, 1, \ldots, M = 2N+1)$, suppose for the moment such sequences of approximate lens surfaces to exist and consider especially such sequences of approximate lens surfaces $S_N$ and $S'_N$ which control perfectly with respect to emergent direction $\psi$ and optical path length P the particular set of $2N+2$ meridional rays $R_0$, $R'_0$, $R_{Nj}$ and $R'_{Nj}$ for $(j=1, 2, \ldots, N)$ from the focus F which are shown in FIG. 4. Let $R_0$ and $R'_0$ as before be the extremal rays through $E_0$ and $E'_0$ and let $R_{N1}$ and $R'_{N1}$ be the central rays which pass through the vertices $I'_{N0}$ and $I_{N0}$ of $S'_N$ and $S_N$ respectively. Similarly, denoting by $J_{N, j-1}$ and $J'_{N, j-1}$ the points of incidence on $S_N$ and emergence from $S'_N$ of $R_{N, j-1}$ and $R'_{N, j-1}$ for $(j = 2, 3, \ldots, N)$, and denoting by $I_{N, j-1}$ and $I'_{N, j-1}$ the image points of the points $J_{N, j-1}$ and $J'_{N, j-1}$ let the meridional rays $R_{Nj}$ and $R'_{Nj}$ for $(j = 2, 3, \ldots, N)$ be defined as those meridional rays which pass through the points $I'_{N, j-1}$ and $I_{N, j-1}$, the images in question being taken in the $x$-axis as in FIG. 4. The definition of the set of $2N+2$ meridional rays $R_0$ and $R'_0$, $R_{Nj}$ and $R'_{Nj}$ for $(j=1, 2, \ldots, N)$ is thus completed by a process of succession. As before let the extremal rays $R_0$ and $R'_0$ emanate from the focus F at angles of inclination $\phi_0$ and $\phi'_0$ as in (4.2) and let these angles be measured positively as in FIG. 4. Likewise let the meridional rays $R_{Nj}$ and $R'_{Nj}$ for $(j=1, 2, \ldots, N)$ emanate from the focus F at angles of inclination $\phi_j$ and $\phi'_j$ and, after refraction at the approximate lens surface $S_N$, let these meridional rays proceed through the approximate lens at angles $\chi_j$ and $\chi'_j$ with the horizontal where all of these additional angles are taken from the horizontal to the relevant ray segment, are measured positively in the clockwise sense and are unknowns dependent on N. Similarly as before let the direction or slope angles $\xi_0$ and $\xi'_0$ of the approximate lens surfaces $S_N$ and $S'_N$ at $E_0$ and $E'_0$ be defined and measured positively as in FIG. 4. With each of the points $I_{N0}$, $I'_{N0}$, $I_N$, $_{j-1}$, $I'_N$, $_{j-1}$ and $J_{N1}$, $J'_{Nj}$, $J_{Nj}$, $J'_{Nj}$ for $(j=2, 3, \ldots, N)$ associate a set of $x$, $y$-coordinates and an acute direction or slope angle $-\xi$ for the approximate lens surface $S_N$ or $S'_N$ and let these latter angles be taken from the horizontal to the normal to $S_N$ or $S'_N$ and be measured positively in the counterclockwise sense. Finally, let these coordinates and angles be labeled according to the following lists:

| Ray | Points on $S_N$ | | Points on $S'_N$ | |
|---|---|---|---|---|
| $R_0$ | $E_0(0, b_0)$ | $\xi_0$ | $E_0(0, b_0)$ | $\xi'_0$ |
| $R_{Nj}$ | $J_{Nj}(x_j, y_j)$ | $\xi_j$ | $I'_{N,j-1}(x'_{j-1}, y'_{j-1})$ | $\xi'_{j-1}$ |
| $R_{N1}$ | $J_{N1}(x_1, y_1)$ | $\xi_1$ | $I'_{N0}(\beta'_0, 0)$ | 0 |
| $R'_{N1}$ | $I_{N0}(\beta_0, 0)$ | 0 | $J'_{N1}(x'_1, -y'_1)$ | $-\xi'_1$ |
| $R'_{Nj}$ | $I_{N,j-1}(x_{j-1}, -y_{j-1})$ | $-\xi_{j-1}$ | $J'_{Nj}(x'_j, -y'_j)$ | $-\xi'_j$ |
| $R'_0$ | $E'_0(0, -b_0)$ | $\xi_0$ | $E'_0(0, -b_0)$ | $\xi'_0$ | where $(j = 2, 3, \ldots, N)$ and where, with the exception of the preassigned lens extremities $E_0$ and $E'_0$ and their coordinates, all of these points, coordinates and angles are unknowns and where, moreover, of the latter all but the angles $\xi_0$ and $\xi'_0$ depend on N.

The first step in the solution for the approximate lens surfaces $S_N$ and $S'_N$ as in (5.2), or for their coefficients $\beta_i = \beta_i(N)$ and $\beta'_i = \beta'_i(N)$ for $i = 0, 1, \ldots, M = 2N+1$), again is the determination in the meridional plane of the slope angles $\xi_0$ and $\xi'_0$ of $S_N$ and $S'_N$ at $E_0$ and $E'_0$ in such a way that the extremal rays $R_0$ and $R'_0$ from F are bent through just the desired angles as in FIG. 4. Denoting the angles of incidence of $R_0$ and $R'_0$ on $S_N$ by $\Pi_0 = \phi_0 - \xi_0$ and $\Pi'_0 = \phi'_0 - \xi'_0$ as previously and associating prisms of angles $\Delta_0 = \xi'_0 - \xi_0$ and $\Delta'_0 = \xi'_0 - \xi_0$ with $R_0$ and $R'_0$ at $E_0$ and $E'_0$ as in FIG. 4, the solutions for the angles $\xi_0$ and $\xi'_0$ are obtained by solving the prism equations (4.5) graphically as before where the angles $\phi_0$ and $\phi'_0$ are given by (4.2). The solutions for the angles $\xi_0$ and $\xi'_0$ thus having been determined independent of N, let the value of N be fixed at this stage of the solution for $S_N$ and $S'_N$ and single out the positive angles $\phi_1$ and $\phi'_1$ associated with the central rays $R_{N1}$ and $R'_{N1}$ as previously introduced, as characteristic parameters $\phi_1$ and $\phi'_1$ to be determined for fixed N, in terms of which, it will be seen, the coefficients $\beta_i = \beta_i(N)$ and $\beta'_i = \beta'_i(N)$ for $i = 0, 1, \ldots, M = 2N+1$) of $S_N$ and $S'_N$, as well as all other unknowns of the problem, may be expressed completely. Using the notations previously established note that in order for the approximate lens surfaces $S_N$ and $S'_N$ in the forms (5.2) to control perfectly the $2N+2$ meridional rays $R_0$, $R'_0$, $R_{Nj}$ and $R'_{Nj}$ for $(j=1, 2, \ldots, N)$ the coefficients $\beta_i = \beta_i(N)$ for $(i=0, 1, \ldots, M=2N+1)$ of $S_N$ must satisfy the $2N+2$ simultaneous linear equations $$b^2{}_0 \beta_1 + b^4{}_0 \beta_2 + \ldots + b^{2M}{}_0 \beta_M + \beta_0 = 0$$
$$2b_0\beta_1 + 4b_0^3 \beta_2 + \ldots + 2Mb_0^{2M-1}\beta_M + \tan \xi_0 = 0$$
(5.3) $S_N$: $y^2{}_j \beta_1 + y^4{}_j \beta_2 + \ldots + y_j^{2M} \beta_M + \beta_0 - x_j = 0$
$$2y_j\beta_1 + 4y_j^3\beta_2 + \ldots + 2My_j^{2M-1}\beta_M + \tan \xi_j = 0$$
$$(j=1, 2, \ldots, N; M=2N+1)$$

while the coefficients $\beta'_i = \beta'_i(N)$ for $(i=0, 1, \ldots, M=2N+1)$ of $S'_N$ must satisfy the $2N+2$ simultaneous linear equations $$b^2{}_0 \beta'_1 + b^4{}_0 \beta'_2 + \ldots + b_0^{2M} \beta'_M + \beta'_0 = 0$$
$$2b_0\beta'_1 + 4b_0^3\beta'_2 + \ldots$$
$$+ 2Mb_0^{2M-1}\beta'_M + \tan \xi'_0 = 0$$
(5.4) $S'_N$: $y'^2{}_j \beta'_1 + y'^4{}_j \beta'_2 + \ldots + y_j'^{2M} \beta'_M + \beta'_0 - x'_j = 0$
$$2y'_j\beta'_1 + 4y'^3{}_j\beta'_2 + \ldots$$
$$+ 2My_j'^{2M-1}\beta'_M + \tan \xi'_j + 0$$
$$(j=1, 2, \ldots, N; M=2N+1)$$

The conditions for solvability of these sets of simultaneous linear equations will emerge as the means for determination of the characteristic parameters $\phi_1$ and $\phi'_1$ for given N.

Next the conditions are imposed that the emergent ray angles $\psi$ and optical path lengths $P$ in (2.2) associated with the meridional rays $R_{Nj}$ and $R'_{Nj}$ for $(j=1, 2, \ldots, N)$ all shall have the values $\psi_0$ and $P_0$ respectively where $P_0$ is given by (3.3) while Snell's law is satisfied at each of the approximate lens surfaces $S_N$ and $S'_N$. Then, the coefficients of the quantities $\beta_i = \beta_i(N)$ for $(i=1, 2, \ldots, M=2N+1)$ together with the remaining additive terms in (5.3) and the coefficients of the quantities $\beta'_i = \beta'_i(N)$ for $(i=1, 2, \ldots, M=2N+1)$ together with the corresponding additive terms in (5.4) are related to one another by the equations of connection $$P \equiv (x_1 - x_0) \sec \phi_1 + n_0(\beta'_0 - x_1) \sec \chi_1 + (a - \beta'_0) \cos \psi_0 = P_0$$
$$y_0 - y_1 + (x_0 - x_1) \tan \phi_1 = 0$$
(5.5) $R_{N1}$:  $y_1 - (\beta'_0 - x_1) \tan \chi_1 = 0$
$$\sin(\phi_1 + \xi_1)/\sin(\chi_1 + \xi_1) = n_0$$
$$\sin \chi_1 / \sin \psi_0 = 1/n_0$$

and $$P \equiv [(x_0 - x_j)^2 + (y_0 - y_j)^2]^{1/2} + n_0(x'_{j-1} - x_j) \sec \chi_j + (a - x'_{j-1}) \cos \psi_0 + y'_{j-1} \sin \psi_0 = P_0$$
$$y_0 - y_j + (x_0 - x_j) \tan \phi_j = 0$$
(5.6) $R_{Nj}$: $y_j - y'_{j-1} - (x'_{j-1} - x_j) \tan \chi_j = 0$
$$\sin(\phi_j + \xi_j)/\sin(\chi_j + \xi_j) = n_0$$
$$\sin(\chi_j + \xi'_{j-1})/\sin(\psi_0 + \xi'_{j-1}) = 1/n_0$$
$$(j=2, 3, \ldots, N)$$

for the meridional rays $R_{Nj}$ for $(j=1, 2, \ldots, N)$ and by the equations of connection $$P \equiv (\beta_0 - x_0) \sec \phi'_1 + n_0(x'_1 - \beta_0) \sec \chi'_1 + (a - x'_1) \cos \psi_0 - y'_1 \sin \psi_0 = P_0$$
$$y_0 + (x_0 - \beta_0) \tan \phi'_1 = 0$$
(5.7) $R'_{N1}$: $y'_1 - (x'_1 - \beta_0) \tan \chi'_1 = 0$
$$\sin \phi'_1 / \sin \chi'_1 = n_0$$
$$\sin(\chi'_1 - \xi'_1)/\sin(\psi_0 - \xi'_1) = 1/n_0$$

and $$P \equiv [(x_0 - x_{j-1})^2 + (y_0 + y_{j-1})^2]^{1/2} + n_0(x'_j - x_{j-1}) \sec \chi'_j + (a - x'_j) \cos \psi_0 - y'_j \sin \psi_0 = P_0$$
$$y_0 + y_{j-1} + (x'_j - x_{j-1}) \tan \phi'_j = 0$$
(5.8) $R'_{Nj}$: $y'_j + y_{j-1} - (x_0 - x_{j-1}) \tan \chi'_j = 0$
$$\sin(\phi'_j - \xi_{j-1})/\sin(\chi'_j - \xi_{j-1}) = n_0$$
$$\sin(\chi'_j - \xi'_j)/\sin(\psi_0 - \xi'_j) = 1/n_0$$
$$(j=2, 3, \ldots, N)$$

for the meridional rays $R'_{Nj}$ for $(j=1, 2, \ldots, N)$ whence it is seen that the quantities $\beta_0$, $x_j$, $y_j$, $\xi_j$ and $\beta'_0$, $x'_j$, $y'_j$, $\xi'_j$ for $(j=1, 2, \ldots, N)$ may all be expressed as finite elementary functions of the characteristic parameters $\phi_1$ and $\phi'_1$ treated as independent variables. The actual solutions may be found successively in two separate sequences in the orders $R_{N1}$, $R'_{N2}$, $R_{N3}$, $R'_{N4}$, …, $R_{NN}$ or $R'_{NN}$ and $R'_{N1}$, $R_{N2}$, $R'_{N3}$, $R_{N4}$, …, $R'_{NN}$ or $R_{NN}$ and will be denoted as (5.9) $\quad \beta_0 = B_0(\phi'_1)$, $\beta'_0 = B'_0(\phi_1)$ and $$x_j = X_j(\theta), \quad y_j = Y_j(\theta), \quad \xi_j = \Xi_j(\theta)$$
(5.10) $\quad x'_j = X'_j(\theta'), \quad y'_j = Y'_j(\theta'), \quad \xi'_j = \Xi'_j(\theta')$
$$(j=1, 2, \ldots, N)$$

where $\theta = \phi_1$, $\theta' = \phi'_1$ when $j$ is odd and $\theta = \phi_1$, $\theta' = \phi_1$ when $j$ is even. The first of these solutions (5.9) and (5.10) may be explicitly written in terms of $\phi_1$ and $\phi'_1$ in the forms (5.11) $\quad B_0(\phi'_1) = C \cot \phi'_1 - A$
$\quad B'_0(\phi_1) = X_1(\phi_1) + (F/E) Y_1(\phi_1)$ and $$X_1(\phi_1) = \frac{A + G(C \cos \phi_1 - A \sin \phi_1) - B \cos \phi_1}{D \cos \phi_1 + G \sin \phi_1 - 1}$$
(5.12)
$$Y_1(\phi_1) = \frac{B \sin \phi_1 + D(C \cos \phi_1 - A \sin \phi_1) - C}{D \cos \phi_1 + G \sin \phi_1 - 1}$$
$$\Xi_1(\phi_1) = \tan^{-1}[(\sin \phi_1 - E)/(F - \cos \phi_1)]$$

and $$X'_1(\phi'_1) = \frac{B \sin \phi'_1 + K(C \cos \phi'_1 - A \sin \phi'_1) - C}{(K-D) \sin \phi'_1}$$
(5.13)
$$Y'_1(\phi'_1) = \frac{B \sin \phi'_1 + D(C \cos \phi'_1 - A \sin \phi'_1) - C}{(K-D)H}$$
$$\Xi'_1(\phi'_1) = \tan^{-1}[(\sin \phi'_1 - E)/(H - D)]$$

where A, B, C and so forth are the numerical constants or functions of $\phi'_1$ given by the formulas $$A = |x_0|, \quad B = [b^2{}_0 + x^2{}_0 \sec^2 \psi_0]^{1/2}$$
$$C = [b^2{}_0 + x^2{}_0 \sec^2 \psi_0]^{1/2} \sin \psi_0 = y_0$$
$$D = \cos \psi_0, \quad E = \sin \psi_0$$
(5.14) $\quad F = [n^2{}_0 - \sin^2 \psi_0]^{1/2}$
$$G = [n^2{}_0 - (n^2{}_0 - \sin^2 \psi_0)^{1/2} \cos \psi_0] \csc \psi_0$$
$$H = [n^2{}_0 - \sin^2 \phi'_1]^{1/2}$$
$$K = [n^2{}_0 - \sin \phi'_1 \sin \psi_0]/[n^2{}_0 - \sin^2 \phi'_1]^{1/2}$$

while the latter of these solutions (5.10) may be readily evaluated from the former by a process of successive substitutions and elementary algebra.

The next step in the solution for the approximate lens surfaces $S_N$ and $S'_N$ as in (5.2), or for their coefficients $\beta_i=\beta_i(N)$ and $\beta'_i=\beta'_i(N)$ for $$(i=0, 1, \ldots, M=2N+1)$$

is the substitution of the expressions (5.9) and (5.10) for $x_j$, $y_j$, $\xi_j$ and $\beta'_0$, $x'_j$, $y'_j$, $\xi_j$ for $(j=1, 2, \ldots, N)$ in terms of the characteristic parameters $\phi_1$ and $\phi'_1$ into the simultaneous linear equations (5.3) and (5.4) whence the satisfaction of the latter two sets of equations becomes both a necessary and a sufficient condition for the approximate lens surfaces $S_N$ and $S'_N$ to control perfectly the $2N+2$ meridional rays $R_0$, $R'_0$, $R_{Nj}$ and $R'_{Nj}$ for $(j=1, 2, \ldots, N)$. Consequently, employing an elementary theorem of algebra for the existence of solutions for the quantities $\beta_i=\beta_i(N)$ and $\beta'_i=\beta'_i(N)$ for equations (5.3) and (5.4), a necessary condition is that for fixed $N$ the characteristic parameters $\phi_1$ and $\phi'_1$ must satisfy the simultaneous determinantal equations $$(5.15)\quad \Delta(\phi_1,\phi'_1) \equiv \begin{vmatrix} b^2_0 & b^3_0 & \ldots & b_0^{2M} & B_0 \\ 2b_0 & 4b^3_0 & \ldots & 2Mb_0^{2M-1} & \tan \xi_0 \\ Y^2_j & Y^4_j & \ldots & Y_j^{2M} & B_0-X_j \\ 2Y_j & 4Y^3_j & \ldots & 2MY_j^{2M-1} & \tan \Xi_j \end{vmatrix} = 0$$

$$(j=1, 2, \ldots, N; M=2N+1)$$

and $$(5.16)\quad \Delta'(\phi_1,\phi'_1) \equiv \begin{vmatrix} b^2_0 & b^4_0 & \ldots & b_0^{2M} & B'_0 \\ 2b_0 & 4b^3_0 & \ldots & 2Mb_0^{2M-1} & \tan \xi'_0 \\ Y'^2_j & Y'^4_j & \ldots & Y'^{2M}_j & B'_0-X'_j \\ 2Y'_j & 4Y'^3_j & \ldots & 2MY'^{2M-1}_j & \tan \Xi'_j \end{vmatrix} = 0$$

$$(j=1, 2, \ldots, N; M=2N+1)$$

where the arguments $\phi_1$ and $\phi'_1$ of the expressions (5.9) and (5.10) have been omitted from the writing. These are the characteristic equations for the determination of the values of the characteristic parameters $\phi_1$ and $\phi'_1$ for fixed $N$. Assuming now that the simultaneous determinantal equations (5.15) and (5.16) can be solved uniquely for numerical values of $\phi_1$ and $\phi'_1$ for fixed $N$, as has always been found possible to any desired accuracy by graphical methods in those lens designs actually computed, it then becomes sufficient for completion of the solution to the present problem to substitute these values in the expressions (5.9) and (5.10) thereby obtaining numerical results $\beta_0=\beta_0(N)$, $x_j=x_j(N)$, $y_j=(N)$, $\xi_j=\xi_j(N)$ and $\beta'_0=\beta'_0(N)$, $x'_j=x'_j(N)$, $y'_j=y'_j(N)$, $\xi'_j=\xi'_j(N)$ for $(j=1, 2, \ldots, N)$ and thence to solve for numerical values of the remaining coefficients $\beta_i=\beta_i(N)$ and $\beta'_i=\beta'_i(N)$ for $(i=1, 2, \ldots, M=2N+1)$ in the simultaneous linear equations (5.3) and (5.4). The characteristic parameters $\phi_1$ and $\phi'_1$ being dependent on $N$, it is clear as anticipated by the notation that the coefficients $\beta_i=\beta_i(N)$ and $\beta'_i=\beta'_i(N)$ for $$(i=0, 1, \ldots, M=2N+1)$$

also depend on $N$. In fact for the leading coefficients of $S_N$ and $S'_N$ $$(5.17)\quad \beta_0(N)=B_0(\phi'_1(N)),\ \beta'_0(N)=B'_0(\phi_1(N))$$

where $B_0(\phi'_1)$ and $B'_0(\phi_1)$ are given explicitly by the formulas (5.11). This completes the formal solution for the approximate lens surfaces $S_N$ and $S'_N$ in the forms (5.2) which under the original assumptions then converge in the meridional plane to the exact lens surfaces $S$ and $S'$ uniformly for $|y| \leq b_0$ whether or not the assumed expansion (5.1) actually holds.

6. *Formal Solution For the Lens Surfaces by Taylor Series Expansion*

Along with the fundamental assumption concerning the existence of one set of exact lens surfaces $S$ and $S'$ satisfying the requirements of the problem for a suitable choice of the given parameters (2.1) this time let it be assumed that these exact lens surfaces are representable in the meridional plane by power series expansions of the forms $$S:\ x=\gamma_1(y^2-b^2_0)+\gamma_2(y^2-b^2_0)^2+\gamma_3(y^2-b^2_0)^3+\ldots$$
(6.1)
$$S':\ x=\gamma'_1(y^2-b^2_0)+\gamma'_2(y^2-b^2_0)^2+\gamma'_3(y^2-b^2_0)^3+\ldots$$

where as before these series are assumed uniformly convergent for $|y| \leq b_0$ and define symmetric contours about the $x$-axis. The process given for developing the exact lens surfaces $S$ and $S'$ will be seen to be quite different from that of the preceding section in that in the present treatment the series expansions (6.1) actually will be carried out with the coefficients $\gamma_i$ and $\gamma'_i$ for $(i=1, 2, \ldots)$ of $S$ and $S'$ therein evaluated analytically. In design practice one will of course limit the computation to the determination of the partial sums $S_N$ and $S'_N$ of the series (6.1) and some fixed $N$.

Figure 5:
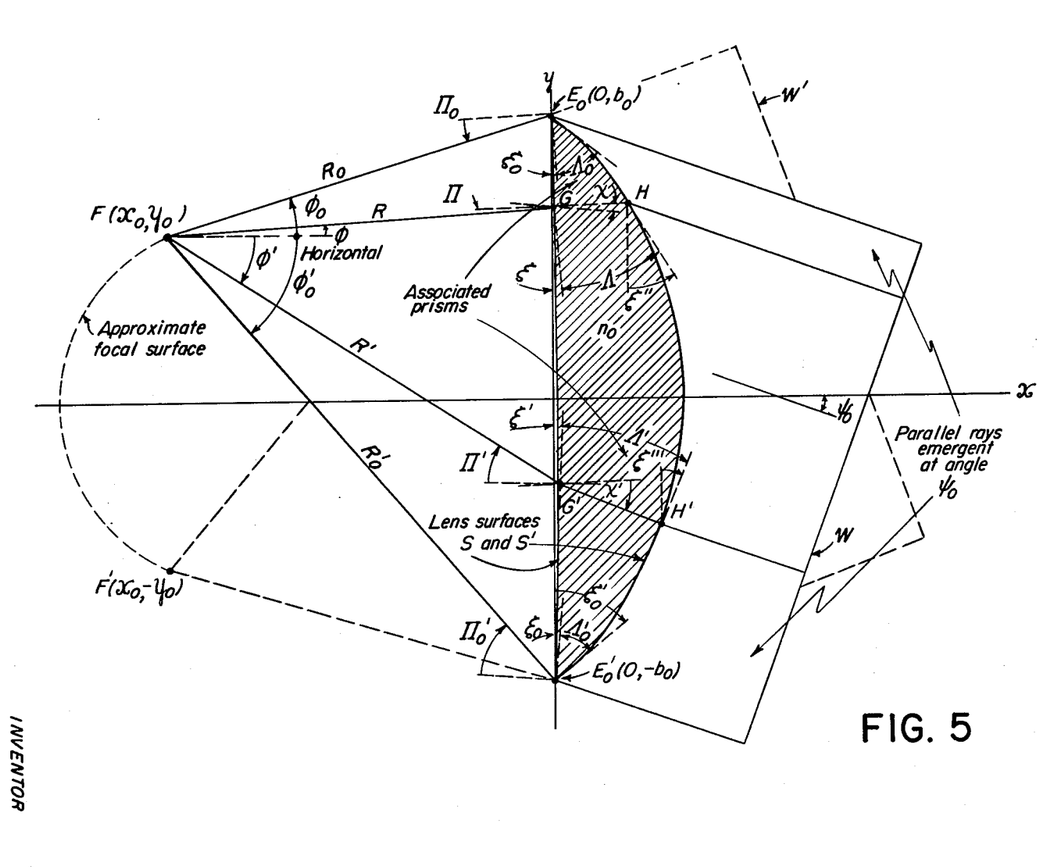
FIG. 5 is a cross-section of a single lens section helpful in understanding the determination of the lens surfaces by the Taylor series expansion method.

To effect the formal solution for the exact lens surfaces $S$ and $S'$ in the forms (6.1) or, more particularly, the solution for their coefficients $\gamma_i$ and $\gamma'_i$ for $(i=1, 2, \ldots)$, suppose for the moment these exact lens surfaces to be already in existence and consider the four meridional rays $R_0$, $R'_0$, $R$ and $R'$ from the focus $F$ and emergent at the angle $\psi=\psi_0$ exactly which are shown in FIG. 5. By symmetry a corresponding set of four meridional rays from the focus $F'$ would do just as well. Let $R_0$ and $R'_0$ as before be the extremal rays of the system which emanate from $F$ at angles of inclination $\phi_0$ and $\phi'_0$ given by formulas (4.2) and which then pass through the lens extremities $E_0$ and $E'_0$ and let $R$ and $R'$ be variable rays which emanate from $F$ at variable angles of inclination $\phi$ and $\phi'$ and which, after refraction at the exact lens surface $S$, then proceed through the lens at angles $\chi$ and $\chi'$ with the horizontal where all of these angles are taken from the horizontal to the relevant ray segment and are measured positively in the directions shown in FIG. 5. The angles of inclination $\phi$ and $\phi'$ will be taken as the independent variables of the problem. Let $G$, $H$ and $G'$, $H'$ be the points of incidence on $S$ and emergence from $S'$ of the variable rays $R$ and $R'$ and associate with each of these points a set of $x$, $y$-coordinates and an acute direction or slope angle $-\xi$ for the exact lens surfaces $S$ and $S'$ and let these angles be taken from the vertical to the tangent to $S$ or $S'$ and also be measured positively in the directions shown in FIG. 5. Let these coordinates and angles together with the corresponding quantities associated with the points $E_0$ and $E'_0$ be labeled as below:

| Ray | Points on S | | Points on S' | |
|---|---|---|---|---|
| $R_0$ | $E_0(0,b_0)$ | $\xi_0$ | $E_0(0,b_0)$ | $\xi'_0$ |
| $R$ | $G(x,y)$ | $\xi$ | $H(x'',y'')$ | $\xi''$ |
| $R'$ | $G'(x',-y')$ | $\xi'$ | $H'(x''',-y''')$ | $\xi'''$ |
| $R'_0$ | $E'_0(0,-b_0)$ | $\xi_0$ | $E'_0(0,-b_0)$ | $\xi'_0$ | where $y$ and $y'$ are taken non-negative and where, with the exception as before of the lens extremities $E_0$ and $E'_0$ and their coordinates, all of these points, coordinates and angles are unknowns and where, finally, all of the latter except $\xi_0$ and $\xi'_0$ are variables dependent on $\phi$ or $\phi'$, those variables associated with $R$ being considered functions of $\phi$ and those associated with $R'$ being considered functions of $\phi'$. In terms of the preceding notations the angles of incidence $\Pi_0$, $\Pi'_0$, $\Pi$ and $\Pi'$ of the meridional rays $R_0$, $R'_0$, $R$ and $R'$ on $S$ may be written as $$\Pi_0=\phi_0-xi_0,\quad \Pi'_0=\phi'_0-xi_0,$$
(6.2)
$$\Pi=\phi-xi,\quad \Pi'=\phi'-xi'$$

where $\Pi$ and $\Pi'$ are thus functions of $\phi$ and $\phi'$ respectively. Finally, associate prisms of angles $\Lambda_0$, $\Lambda'_0$, $\Lambda$ and $\Lambda'$ with the meridional rays $R_0$, $R'_0$, $R$ and $R'$ with these prisms determined in the meridional plane by the tangents to the lens surfaces $S$ and $S'$ at the points $E_0$, $E'_0$ $G$, $H$ and $G'$, $H'$, where we have thus, (6.3)  $\Lambda_0=\Lambda'_0=\xi'_0-\xi_0,\ \Lambda=\xi''-\xi,\ \Lambda'=\xi'''-\xi'$ and wherein it may be noted $\Lambda$ and $\Lambda'$ like $\Pi$ and $\Pi'$ are functions of $\phi$ and $\phi'$ respectively.

The first step in the solution for the exact lens surfaces S and S' in the forms (6.1), or for their coefficients $\gamma_i$ and $\gamma_i'$ for ($i=1, 2, \ldots$), in the present treatment is to note with the aid of FIG. 5 and the notion of the prism function $D(\Pi, \Lambda; n_0)$ introduced previously in (4.3), the fundamental identities (6.4)
$$\psi(\phi) \equiv D(\Pi, \Lambda; n_0) - \phi \equiv \psi_0$$
$$-\psi'(\phi') \equiv D(\Pi', \Lambda'; n_0) - \phi' \equiv -\psi_0$$

analogous to the prism equations (4.5) for the angles of emergence $\psi=\psi(\phi)$ and $\psi'=\psi'(\phi')$ of the variable rays R and R'. By the theorem of Malus the satisfaction of these identities is both a necessary and a sufficient condition for the lens surfaces S and S' to be exact. Differentiating with respect to $\phi$ and $\phi'$ in the identities (6.4) the further identities (6.5)
$$(d/d\phi)D(\Pi, \Lambda; n_0) \equiv 1, \quad (d/d\phi')D(\Pi', \Lambda'; n_0) \equiv 1$$

are obtained and, finally, in a like manner the identities (6.6)
$$(d^j/d\phi^j)D(\Pi, \Lambda; n_0) \equiv 0$$
$$(d^j/d\phi'^j)D(\Pi', \Lambda'; n_0) \equiv 0, \quad (j=2,3, \ldots)$$

each of which likewise must hold. Substituting for $\Pi$, $\Pi'$, $\Lambda$ and $\Lambda'$ from (6.2) and (6.3) into (6.4), (6.5) and (6.6), expanding the derivatives in (6.5) and (6.6) by partial differentiation of the prism function (4.3) and expressing the derivatives of the variables $\xi$, $\xi'$, $\xi''$ and $\xi'''$ with respect to $\phi$ and $\phi'$ in terms of the derivatives of those variables with respect to $y$, $y'$, $y''$ and $y'''$ by the composite function theorem, the foregoing identities go over into a set of infinitely many pairs of identities between the unknown variables $\xi$, $\xi'$, $\xi''$ and $\xi'''$ and their derivatives with respect to $y$, $y'$, $y''$ and $y'''$. The first of these relations are the identities (6.7)
$$D(\phi-\xi, \xi''-\xi; n_0) - \phi \equiv \psi_0$$
$$D(\phi'-\xi', \xi'''-\xi'; n_0) - \phi' \equiv \psi_0$$

corresponding to (6.4) and involve the aforementioned variables $\xi$, $\xi'$, $\xi''$ and $\xi'''$ but not their derivatives. The second pair of these identities corresponding to (6.5) are the identities $$D_\Pi(\phi-\xi, \xi''-\xi; n_0) \cdot \left[1 - \frac{d\xi}{dy}\frac{dy}{d\phi}\right]$$
$$+ D_\Lambda \cdot \left[\frac{d\xi''}{dy''}\frac{dy''}{dy}\frac{dy}{d\phi} - \frac{d\xi}{dy}\frac{dy}{d\phi}\right] = 1$$

(6.8)
$$D_\Pi(\phi'-\xi', \xi'''-\xi'; n_0) \cdot \left[1 - \frac{d\xi'}{dy'}\frac{dy'}{d\phi'}\right]$$
$$+ D_\Lambda \cdot \left[\frac{d\xi'''}{dy'''}\frac{dy'''}{dy'}\frac{dy'}{d\phi'} - \frac{d\xi'}{dy'}\frac{dy'}{d\phi'}\right] = 1$$

where in each relation the arguments of the partial derivatives $D_\Lambda$ are the same as those of the partial derivatives $D_\Pi$ so that these identities thus involve the variables $\xi$, $\xi'$, $\xi''$ and $\xi'''$ together with their first derivatives. Similarly the third pair of these identities corresponding to (6.6) for $j=2$ are the identities $$D_\Pi(\phi-\xi, \xi''-\xi; n_0) \cdot \left[-\frac{d^2\xi}{dy^2}\left(\frac{dy}{d\phi}\right)^2 - \frac{d\xi}{dy}\frac{d^2y}{d\phi^2}\right]$$
$$+ D_\Lambda \cdot \left[\frac{d^2\xi''}{dy''^2}\left(\frac{dy''}{dy}\frac{dy}{d\phi}\right)^2 + \frac{d\xi''}{dy''}\frac{d^2y''}{dy^2}\left(\frac{dy}{d\phi}\right)^2\right.$$
$$\left. + \frac{d\xi''}{dy''}\frac{dy''}{dy}\frac{d^2y}{d\phi^2} - \frac{d^2\xi}{dy^2}\left(\frac{dy}{d\phi}\right)^2 - \frac{d\xi}{dy}\frac{d^2y}{d\phi^2}\right] + A \equiv 0$$

(6.9)
$$D_\Pi(\phi'-\xi', \xi'''-\xi'; n_0) \cdot \left[-\frac{d^2\xi'}{dy'^2}\left(\frac{dy'}{d\phi'}\right)^2 - \frac{d\xi'}{dy'}\frac{d^2y'}{d\phi'^2}\right]$$
$$+ D_\Lambda \cdot \left[\frac{d^2\xi'''}{dy'''^2}\left(\frac{dy'''}{dy'}\frac{dy'}{d\phi'}\right)^2 + \frac{d\xi'''}{dy'''}\frac{d^2y'''}{dy'^2}\left(\frac{dy'}{d\phi'}\right)^2\right.$$
$$\left. + \frac{d\xi'''}{dy'''}\frac{dy'''}{dy'}\frac{d^2y'}{d\phi'^2} - \frac{d^2\xi'}{dy'^2}\left(\frac{dy'}{d\phi'}\right)^2 - \frac{d\xi'}{dy'}\frac{d^2y'}{d\phi'^2}\right] + B \equiv 0$$

where U and V are the expressions $$U = D_{\Pi\Pi}(\phi-\xi, \xi''-\xi; n_0) \cdot \left[1 - \frac{d\xi}{dy}\frac{dy}{d\phi}\right]^2$$
$$+ 2D_{\Pi\Lambda} \cdot \left[1 - \frac{d\xi}{dy}\frac{dy}{d\phi}\right]\left[\frac{d\xi''}{dy''}\frac{dy''}{dy}\frac{dy}{d\phi} - \frac{d\xi}{dy}\frac{dy}{d\phi}\right]$$
$$+ D_{\Lambda\Lambda} \cdot \left[\frac{d\xi''}{dy''}\frac{dy}{d\phi} - \frac{d\xi}{dy}\frac{dy}{d\phi}\right]^2$$

(6.10)
$$V = D_{\Pi\Pi}(\phi'-\xi', \xi'''-\xi'; n_0) \cdot \left[1 - \frac{d\xi'}{dy'}\frac{dy'}{d\phi'}\right]^2$$
$$+ 2D_{\Pi\Lambda} \cdot \left[1 - \frac{d\xi'}{dy'}\frac{dy'}{d\phi'}\right]\left[\frac{d\xi'''}{dy'''}\frac{dy'''}{dy'}\frac{dy'}{d\phi'} - \frac{d\xi'}{dy'}\frac{dy'}{d\phi'}\right]$$
$$+ D_{\Lambda\Lambda} \cdot \left[\frac{d\xi'''}{dy'''}\frac{dy'''}{dy'}\frac{dy'}{d\phi'} - \frac{d\xi'}{dy'}\frac{dy'}{d\phi'}\right]^2$$

and where similarly as before in each relation the arguments of the partial derivatives $D_\Lambda$, $D_{\Pi\Lambda}$ and $D_{\Lambda\Lambda}$ are the same as those of the partial derivatives $D_\Pi$ and $D_{\Pi\Pi}$ so that these identities thus involve the variables $\xi$, $\xi'$, $\xi''$ and $\xi'''$ together with their first and second derivatives. Finally, the $j+1$th pair of these identities corresponding to the identities (6.6) for ($j=3, 4, \ldots$) may be noted to involve the aforementioned variables together with their first $j$ derivatives.

The derivatives $dy/d\phi$, $dy'/d\phi'$, $dy''/dy$ and $dy'''/dy'$ are to be determined along with the corresponding higher order derivatives which appear in the identities (6.8) and (6.9) and in the succeeding unwritten relations. To this end displacements $\Delta\phi$, $\Delta\chi$ and $\Delta\phi'$, $\Delta\chi'$ in the positions of the variable rays R and R' respectively are considered whence it is found by geometrical arguments and limit processes the formulas (6.11)
$$\frac{dy}{d\phi} = (y-y_0) \csc \phi \cos \xi \sec (\phi-\xi)$$

$$R: \quad \frac{dy''}{dy} = \frac{\cos \xi'' \cos (\chi-\xi)}{\cos \xi \cos (\xi''-\chi)} + \frac{(x''-x) \cos \xi''}{\cos \chi \cos (\xi''-\chi)}\left(\frac{d\chi}{dy}\right)$$

$$\frac{d^jy}{d\phi^j} = \frac{d^{j-1}}{d\phi^{j-1}}\left(\frac{dy}{d\phi}\right), \quad \frac{d^jy''}{dy^j} = \frac{d^{j-1}}{dy^{j-1}}\left(\frac{dy''}{dy}\right)$$
$$(j=2, 3, \ldots)$$

for the derivatives corresponding to the variable ray R and the formulas (6.12)
$$\frac{dy'}{d\phi'} = (y'+y_0) \csc \phi' \cos \xi' \sec (\phi'-\xi')$$

$$R': \quad \frac{dy'''}{dy'} = \frac{\cos \xi''' \cos (\chi'-\xi')}{\cos \xi' \cos (\xi'''-\chi')} + \frac{(x'''-x') \cos \xi'''}{\cos \chi' \cos (\xi'''-\chi')}\left(\frac{d\chi'}{dy'}\right)$$

$$\frac{d^jy'}{d\phi'^j} = \frac{d^{j-1}}{d\phi'^{j-1}}\left(\frac{dy'}{d\phi'}\right), \quad \frac{d^jy'''}{dy'^j} = \frac{d^{j-1}}{dy'^{j-1}}\left(\frac{dy'''}{dy'}\right)$$
$$(j=2, 3, \ldots)$$

for the derivatives corresponding to the variable ray R'. Next applying Snell's law to R and R' at either of the lens surfaces S or S', convenient expressions are obtained for the quantities $\chi$, $\chi'$, $d\chi/dy$ and $d\chi'/dy'$ and so forth in (6.11) and (6.12) in terms of the unknown variables $\xi$, $\xi'$, $\xi''$ and $\xi'''$ and their derivatives with respect to $y$, $y'$, $y''$ and $y'''$ and so forth. Finally, noting by elementary definitions the relations (6.13)
$$S: \quad \frac{dx}{dy} = -\tan \xi, \quad \frac{d^jx}{dy^j} = -(d^{j-1}/dy^{j-1}) \tan \xi$$
$$(j=2, 3, \ldots)$$
$$\frac{dx'}{dy'} = -\tan \xi', \quad \frac{d^jx'}{dy'^j} = -(d^{j-1}/dy'^{j-1}) \tan \xi'$$

$$S: \quad \frac{dx''}{dy''} = -\tan \xi'', \quad \frac{d^j x''}{dy''^j} = -(d^{j-1}/dy''^{j-1}) \tan \xi''$$
$$(j=2, 3, \ldots)$$
$$\frac{dx'''}{dy'''} = -\tan \xi''', \quad \frac{d^j x'''}{dy'''^j} = -(d^{j-1}/dy'''^{j-1}) \tan \xi'''$$

between the derivatives in the meridional plane of the lens surfaces S and S and the indicated variables, the expression of the desired derivatives (6.11) and (6.12) may be completed in terms of the unknown variables $\xi$, $\xi'$, $\xi''$ and $\xi'''$ and their derivatives with respect to $y$, $y'$, $y''$ and $y'''$. The final formulas (6.11) and (6.12) after simplification and rearrangement contain only known numerical parameters, the unknown variables $\phi$, $\phi'$, $y$, $y'$ and $x$, $x'$, $x''$ and $x'''$ and the unknown variables $\xi$, $\xi'$, $\xi''$ and $\xi'''$ and their derivatives aforementioned.

The next step in the solution for the exact lens surfaces S and S' in the forms (6.1), or for their coefficients $\gamma_i$ and $\alpha'_i$ for ($i=1, 2, \ldots$), is to allow the variable rays R the prisms of angles $\Lambda$ and $\Lambda'$ go over into the prisms of angles $\Lambda_0$ and $\Lambda'_0$ while the angles of incidence $\Pi$ and $\Pi'$ approach the angles of incidence $\Pi_0$ and $\Pi'_0$ as in (6.2), (6.3) and FIG. 5. Thus, allowing the variable $\phi$ and $\phi'$ to pass to the limits $\phi_0$ and $\phi'_0$ respectively, note by continuity arguments, the original assumptions, and the symmetry of the lens surfaces S and S', the limit relations (6.14)
$$\lim_{\phi \to \phi_0} \xi = \lim_{\phi' \to \phi'_0} \xi' = \xi_0$$
$$\lim_{\phi \to \phi_0} \xi'' = \lim_{\phi' \to \phi'_0} \xi''' = \xi'_0$$

between the variable $\xi$, $\xi'$, $\xi''$ and $\xi'''$ and the limit relations (6.15)
$$\lim_{\phi \to \phi_0} \frac{d^j \xi}{dy^j} = \lim_{\phi' \to \phi'_0} \frac{d^j \xi'}{dy'^j} = \left(\frac{d^j \xi}{dy^j}\right)_0$$
$$(j=1, 2, \ldots)$$
$$\lim_{\phi \to \phi_0} \frac{d^j \xi''}{dy''^j} = \lim_{\phi' \to \phi'_0} \frac{d^j \xi'''}{dy'''^j} = \left(\frac{d^j \xi''}{dy''^j}\right)_0$$

between the derivatives of those variables where in the latter the subscript zero notation refers to the common values of the indicated derivatives at the limits $\phi = \phi_0$ and $\phi' = \phi'_0$. Similarly note the limit relations (6.16)
$$\lim_{\phi \to \phi_0} x = \lim_{\phi' \to \phi'_0} x' = \lim_{\phi \to \phi_0} x'' = \lim_{\phi' \to \phi'} x''' = 0$$
$$\lim_{\phi \to \phi_0} y = \lim_{\phi' \to \phi'_0} y' = \lim_{\phi \to \phi_0} y'' = \lim_{\phi' \to \phi'_0} y''' = b_0$$

between the indicated variable coordinates. Hence, putting $\phi = \phi_0$ and $\phi' = \phi'_0$ in the aforenoted infinitely many pairs of identities (6.7), (6.8) and (6.9) and so forth and simplifying with the aid of the relations (6.11) and (6.12) and the limit relations (6.14), (6.15) and (6.16), there is obtained a set of infinitely many pairs of finite equations in the unknown quantities (6.17) $\xi_0, \xi'_0, \left(\dfrac{d^j \xi}{dy^j}\right)_0, \left(\dfrac{d^j \xi''}{dy''^j}\right)_0 \quad (j=1, 2, \ldots)$ which may be solved stepwise in pairs and where, as in (6.15) the subscript zero notation refers to the values of the relevant derivatives at the limits $\phi = \phi_0$ and $\phi' = \phi'_0$. The first of these pairs of finite equations in the unknowns (6.17) corresponding to the identities (6.7) are of course the prism equations (4.5) involving only the unknowns $\xi_0$ and $\xi'_0$ and may be solved for the latter graphically in the manner previously described. The second of these pairs of finite equations in the unknowns (6.17) involve the two unknowns $\xi_0$ and $\xi'_0$ already found together with the two new unknowns $(d\xi/dy)_0$ and $(d\xi''/dy'')_0$ while the $j+$1th pair of these equations in the unknowns (6.17) involve all of the quantities $\xi_0$, $\xi'_0$, $(d\xi/dy)_0$, $(d\xi''/dy'')_0$, $\ldots$, $(d^{j-1}\xi/dy^{j-1})_0$ and $(d^{j-1}\xi''/dy''^{j-1})_0$ already found together with the two new unknowns $(d^j\xi/dy^j)_0$ and $(d^j\xi''/dy''^j)_0$ where ($j=2, 3, \ldots$) and, moreover, all of these second and higher order pairs of equations are linear in the two new unknowns with the result that their solutions may be found by elementary algebra. In this manner the computation of all of the quantities (6.17) may be completed. Finally, expressing the meridional derivatives of the lens surfaces S and S' at the lens extremities $E_0$ and $E'_0$ in terms of the quantities (6.17) by means of formulas of the form (6.13) applied in the limits $\phi = \phi_0$ and $\phi' = \phi'_0$ and equating the resulting quantities to the derivatives of the series (6.1) evaluated for $y = b_0$ the solution may be found for numerical values of the coefficients $\gamma_i$ and $\gamma'_i$ for ($i=1, 2, \ldots$) in the series (6.1) sequentially. The derivatives of the series (6.1) are found by term by term differentiation while the subsequent computations may be carried out in an elementary manner. Thus, for example, for the leading coefficients of S and S', (6.18) $\gamma_1 = -(\frac{1}{2}b_0) \tan \xi_0, \quad \gamma'_1 = -(\frac{1}{2}b_0) \tan \xi'_0$ where $\xi_0$ and $\xi'_0$ are the first of the quantities (6.17). This completes the formal solution for the exact lens surfaces S and S' in the forms (6.1) or, in actual practice, the formal solution for the partial sums $S_N$ and $S'_N$ of the series (6.1) for some fixed N.

7. Ray Tracing, Scanning and Experimental Results

After a trial design for the lens surfaces S and S' or, more generally, a trial design for the Nth approximate lens surfaces $S_N$ and $S'_N$, has been completed by one or another of the methods presented in §§4, 5 and 6, each lens section or zone is ray traced in the meridional plane from the focus F to the orthogonal surface W and the emergent ray angle $\psi$ and optical path length P in (2.2) for each of a fan of meridional rays spanning the aperture are computed and the values are compared with the desired values $\psi_0$ and $P_0$ where $P_0$ is given by (3.3). If along certain meridional rays or, on the average, one or both of the quantities (7.1) $\Delta \psi = |\psi - \psi_0|, \quad \Delta P = |P - P_0|$ exceeds the tolerances imposed by physical considerations relevant to the antenna application for which the lens is intended, then various corrections may be applied or, in the two formal solutions for the lens surfaces S and S' given in Sections 5 and 6, more terms may be taken in the expressions $S_N$ and $S'_N$, i.e., one may use a larger value of N. Ray tracing analyses of a number of trial designs has shown generally that the first approximate solution for the lens surfaces given in Section 4 is quite adequate at the index of refraction $n_0 = 1.594$ for the design of polystyrene lenses with parameters in the ranges $\psi_0 \leq \pi/9$, $F = |x_0|/2b_0 \geq 1$ and $G = \lambda_0/2b_0 \geq 1/50$ as previously mentioned, but that one or the other of the more exact formal solutions for the lens surfaces given is Sections 5 and 6 should be used for those lens design problems having more critical values of the ratios $F = |x_0|/2b_0$ and $G = \lambda_0/2b_0$. In general, while both of the formal solutions of Sections 5 and 6 may be assumed to be exact in the limit, the rate of convergence of the solutions for S and S' in the interval $|y| \leq b_0$ by the method of successive approximations of Section 5 seems to be much greater than that of the solution for S and S' by the series expansion method of Section 6 except for $y$ quite near $b_0$ so that for most problems the former of these methods will probably be preferable to the latter unless suitable correction methods are to be applied.

As found below experimentally or as many be shown by additional ray tracing, lenses of revolution designed by the methods described in the preceding sections not only are of value in producing two or more fixed pencil beams at angles $\psi = \pm \psi_0$ with the axis of the lens but also offer attractive solutions to certain wide angle scanning antenna problems heretofore usually treated by other means. Thus, wide angle sector, conical or spiral scanning in the sector or cone $|\psi| \leq \psi_0$ may be performed with the lens stationary by mechanically or electrically moving the primary source of radiation in an appropriate manner along a curved approximate focal surface back of the lens and passing through the foci F and F' as indicated by the dashed curves of FIGS. 1, 2, 4 and 5. Although the best approximate focal surface for such wide angle scanning seems most easily determined at present by experimental methods, a reasonably good first approximation to it in the meridional plane may be given parametrically by solving the simultaneous linear equations $$y = x \tan [D(\xi'_0 + \psi, \xi'_0 - \xi_0; n_0) - \psi] + b_0$$
(7.2)
$$y = -x \tan [D(\xi'_0 - \psi, \xi'_0 - \xi_0; n_0) + \psi] - b_0$$

for $x = x(\psi)$ and $y = y(\psi)$ where $D(\Pi, \Lambda; n_0)$ is the prism function (4.3) and $\psi$ is the parameter specifying the angle of scan of the beam approximately. Surprisingly enough excellent scanning performance in the sector $|\psi| \leq \psi_0$ may be attained not only with unzoned lenses but with zoned lenses as well.

Figure 6:
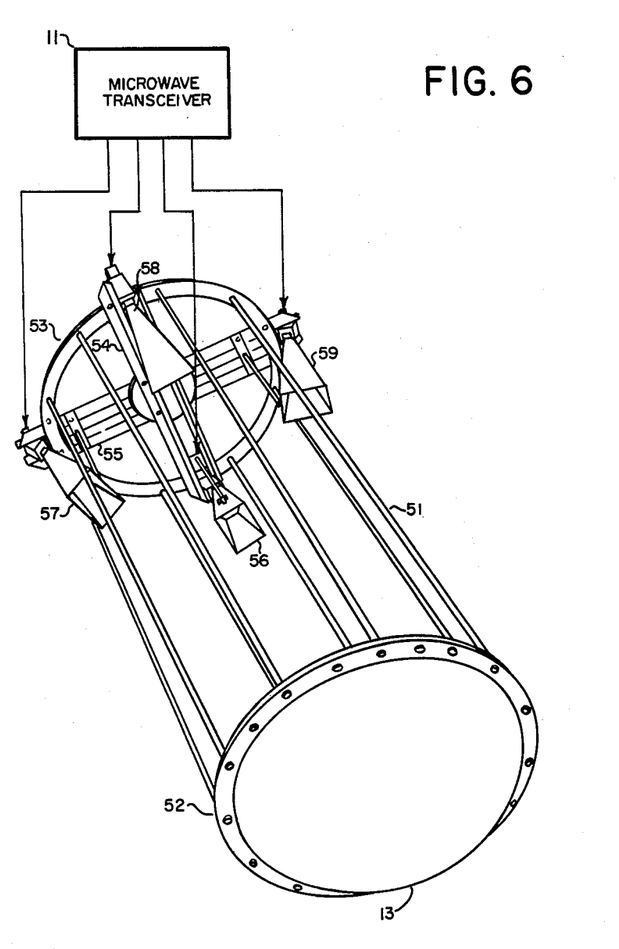
FIG. 6 illustrates in pictorial-block diagram form the means for energizing the lens with microwave energy whereby the angularly oriented collimated microwave beams are provided.

With reference to FIG. 6, there is illustrated a block-pictorial diagram illustrating an application of the lens for focusing microwave energy into a plurality of pencil beams as described in the aforesaid copending application of Maurice A. Meyer. The radiator is energized by and energizes a microwave transceiver 11 and comprises microwave lens 13 secured to the frame 51 by the ring 52. At the opposite end of the frame is another circular ring 53 substantially parallel to ring 52. Cross supports 54 and 55 support horns 56, 57, 58 and 59 which are oriented so that their respective axes intersect at the center of lens 13, and the apparent point source of each horn substantially coincides with a focal point of the lens. Thus, rays of energy emanating from each horn are focused into collimated beams which are radiated at an angle to the lens axis. The angular position of the beam about the axis is dependent upon the angular position about the axis of the apparent point source of the horn from which the rays emanate. Energy received along the line of direction of the radiated beam is focused at the focal point where the horn apparent point source is located.

Other uses of the novel lens structure described herein will be suggested to those skilled in the optical art as well as the microwave art who may make numerous modifications of and departures from the exemplary structures described herein without departing from the inventive concepts. Consequently, the invention is to be construed as limited only by the spirit and scope of the appended claims.

What is claimed is:

1. An axially symmetric dielectric lens with at least one off-axis focal point whose cross-section in a meridional plane which includes the axis of symmetry is bounded by intersecting arcs of even, equal and greater than second degree and of different curvature, said lens focusing rays of energy emerging from said focal point into a beam of parallel rays oriented at a selected direction relative to said axis and converging generally parallel rays from said direction upon said focal point.

2. An axially symmetric dielectric lens, the cross-section of said lens in a meridional plane which includes the axis of symmetry being bounded by intersecting arcs of a circle and quartic curve respectively, said lens having an index of refraction causing rays emanating from a selected off-axis focal point and passing through the points of intersection of said arcs and the point of intersection of the quartic curve arc and said axis to emerge from the lens as substantially parallel rays oriented at an angle relative to said axis while all the other rays from said off-axis focal point which fall upon said lens emerge therefrom as substantially parallel rays oriented in substantially the same direction relative to the axis.

3. An axially symmetric dielectric lens whose cross-section in a meridional plane which includes the axis of symmetry is enclosed by intersecting arcs of even, equal and greater than second degree, said lens having an index of refraction causing a selected number of rays emanating from an off-axis focal point and passing through the lens to emerge from the lens surface as substantially parallel rays angularly oriented relative to said axis, said selected number being related to the degree of said curves while all the other rays from said off-axis focal point which fall upon said lens emerge therefrom as substantially parallel rays oriented in substantially the same said direction relative to the axis.

4. A zoned microwave dielectric lens comprising, a plurality of zoned regions of dielectric material symmetrically disposed about the lens axis, the cross-section of each zoned region in a meridional plane including said axis being bounded by intersecting arcs of even, equal and greater than second degree, said material having an index of refraction whereby rays emanating from an off-axis focal point and passing through the points of intersection of said arcs emerge from the lens as parallel rays angularly oriented relative to the lens axis while all the other rays from said off-axis focal point which fall upon said lens emerge therefrom as substantially parallel rays oriented in substantially the same said direction relative to the axis.

5. A zoned microwave dielectric lens with at least one off-axis focal point for focusing beams of microwave energy comprising, a plurality of zoned regions of dielectric material symmetrically disposed about the lens axis, the cross-section of each zoned region in a meridional plane including said axis being bounded by a pair of intersecting arcs of even, equal and greater than second degree, the points of intersection of each of said pairs of arcs being defined by points $x = a_k$, $y = b_k$ in an orthogonal co-ordinate system wherein the $x$-axis coincides with the lens axis and the $y$-axis passes through the external points of said cross-section with $$a_k = k\lambda_0 \sec \chi_0$$
$$b_0 = [b^2_0 - 2k\lambda_0 |x_0| \sec^3 \chi_0 - k^2 \lambda^2 \sec^4 \chi_0]^{1/2}$$

where $k$ is a zone-indicating integer which increases with increasing proximity of the designated zone to the lens axis, $\lambda_0$ is the wavelength of said microwave energy in air, $\chi_0$ is the angle between said parallel rays and the lens axis, $b_0$ is the distance from the lens axis of said extremal points, and $x_0$ is the $x$ co-ordinate of said focal point.

6. An axially symmetric microwave dielectric lens whose cross-section in a meridional plane which includes the axis of symmetry bounded by intersecting arcs $S_N$ and $S'_N$ of even, equal and greater than second degree curves and having an index of refraction whereby a selected number of rays emanating from an off-axis focal point and passing through the lens, emerge therefrom as substantially parallel rays and angularly oriented relative to said axis, said arcs $S_N$ and $S'_N$ being defined in an orthogonal co-ordinate system wherein the $x$-axis coincides with said axis of symmetry and the $y$-axis passes through the point of intersection of said arcs respectively by $$x = \beta_0(N) + \beta_1(N)y^2 + \ldots + \beta_M(N)y^{2M}$$
$$x = \beta'_0(N) + \beta'_1(N)y^2 + \ldots + \beta'_M(N)y^{2M}$$

where $M = 2N+1$, said selected number is $2N+2$ and the constants $\beta(N)$ and $\beta'(N)$ are determined by the method of successive approximations while all the other rays from said off-axis focal point which fall upon said lens emerge therefrom as substantially parallel rays oriented in substantially the same said direction relative to the axis.

7. Apparatus for radiating microwave energy comprising, an axially symmetric microwave dielectric lens having a cross-section in a meridional plane passing through the lens' axis of symmetry bounded by intersecting circular and quartic arcs, said lens having a plurality of off-axis focal points symmetrically disposed about the lens axis in a plane normal thereto, the index of refraction of said lens being such as to cause rays of microwave energy emanating from a focal point and incident upon the lens to be formed into a collimated beam of substantially parallel rays angularly oriented relative to the lens axis, and means for radiating microwave energy from at least one of said focal points toward said lens.

8. Apparatus for radiating microwave energy comprising, an axially symmetric microwave dielectric lens having a cross-section in a meridional plane passing through the lens' axis of symmetry bounded by intersecting circular and quartic arcs, said lens having a plurality of off-axis focal points symmetrically disposed about the lens axis in a plane normal thereto, the index of refraction of said lens causing rays of energy emanating from a focal point and incident upon the lens surface to be formed into a collimated beam of substantially parallel rays angularly oriented to and about the lens axis in accordance with the angular orientation to and about the lens axis of the focal point from which the energy emanates, a plurality of microwave horns, each of said horns having its apparent point source at a different one of said focal points and oriented with its axis substantially intersecting the center of said lens, and a source of microwave energy coupled to said horns.

9. A symmetric lens of dielectric material, the cross-section of the lens in a meridional plane passing through the lens' axis of symmetry being bounded by intersecting circular and quartic arcs, the lens having at least one off-axis focal point in the meridional plane, and the lens having an index of refraction causing rays emanating from the off-axis focal point to be formed into an emergent collimated beam oriented at an angle relative to the axis of symmetry.

10. An axially symmetric dielectric lens, the cross-section of the lens in a meridional plane passing through the lens' axis of symmetry being bounded by intersecting circular and quartic arcs, and the lens having a plurality of off-axis focal points whose locus is a circle centered on the symmetrical axis and lying in a plane perpendicular to the symmetrical axis.

References Cited in the file of this patent

UNITED STATES PATENTS

| | | |
|---|---|---|
| 1,946,088 | Mauer | Feb. 6, 1934 |
| 2,063,178 | Merte | Dec. 8, 1936 |
| 2,380,888 | Warmisham | July 31, 1945 |
| 2,547,416 | Skellett | Apr. 3, 1951 |
| 2,637,242 | Osterberg et al. | May 5, 1953 |
| 2,729,816 | Crawford | Jan. 3, 1956 |
| 2,736,894 | Kock | Feb. 28, 1956 |

FOREIGN PATENTS

| | | |
|---|---|---|
| 160,492 | Great Britain | Mar. 21, 1921 |
| 660,352 | Great Britain | Nov. 7, 1951 |

OTHER REFERENCES

Born and Wolf: Principles of Optics, Pergamon Press, 1939, pages 246, 247.

Sternberg: "Successive Approximation and Expansion Methods in the Numerical Design of Microwave Dielectric Lenses," Journal of Mathematics and Physics, vol. XXXIV, No. 4, January 1956.

Article in Wireless Engineer titled Path-Length Microwave Lens, by D. G. Kiely, August 1951, pages 248, 249 and 250.

Article in The Journal of Radio Communication titled The TD-2 Relay Lens Antenna, vol. 12, issue 3, pages 22, 23, and 24, by A. H. Lince, March 1952.

"Dielectric Bifocal Lenses," R. M. Brown, Institute of Radio Engineers Convention Record, vol. 4, pt. 1-5, 1956, July 25, 1956, pages 180–187.

Microwave Lenses, J. Brown, London, Methuen & Co. Ltd., New York, John Wiley & Sons, Inc. First published in 1953, received March 26, 1954, pages 69–82.

"The Design of a Zoned Dielectric Lens for Wide Angle Scanning," The Marconi Review, No. 117, vol. XVIII, 2nd Quarter, 1955, pages 37–47.

UNITED STATES PATENT OFFICE
CERTIFICATE OF CORRECTION

Patent No. 3,146,451                      August 25, 1964

Robert L. Sternberg

It is hereby certified that error appears in the above numbered patent requiring correction and that the said Letters Patent should read as corrected below.

Column 3, line 10, for "surfacs" read -- surfaces --; line 62, for "a" read -- as --; column 4, line 45, after "is" insert -- the --; column 6, line 23, for "$\Lambda=\xi'_0-\xi_0$" read -- $\Lambda_0=\xi'_0-\xi_0$ --; line 27, for "signals" read -- angles --; line 62, for "surface" read -- surfaces --; column 7, line 2, strike out "as"; line 50, for "is" read -- it --; column 8, line 26, for "$I_{N,j-1}$", second occurrence, read -- $I'_{N,j-1}$ --; column 10, lines 14 and 15 should appear as shown below instead of as in the patent:

$$(5.8) \quad R'_{Nj}: \quad \begin{array}{l} y_0 + y_{j-1} + (x_0 - x_{j-1}) \tan \phi'_j = 0 \\ y'_j - y_{j-1} - (x'_j - x_{j-1}) \tan \chi'_j = 0 \end{array}$$

column 11, line 16, before "equations" insert -- (i=1,2,..., M-2N+1) in the simultaneous linear --; line 20, for "$b_0^2 \; b_0^3 \; ... b_0^{2M}$" read -- $b_0^2 \; b_0^4 \; ... b_0^{2M}$ --; column 12, line 5, second equation (first part), for "$S': x=y'_1$" read -- $S': x=\gamma'_1$ --; line 65, for "$II_0=\phi_0-xi_0, \; II'_0=\phi'_0-xi_0$" read -- $II_0=\phi_0-\xi_0, \; II'_0=\phi'_0-\xi_0$ --; line 67, for "$II=\phi-xi, \; II'=\phi'-xi'$" read -- $II=\phi-\xi, \; II'=\phi'-\xi'$ --; column 15, line 3, for "S:" read -- $S'$: --; line 8, for "S", second occurrence, read -- $S'$ --; line 19, for "$\alpha'_i$" read -- $\gamma'_i$ --; same line 19, after "rays R" insert -- and $R'$ to approach the extremal rays $R_0$ and $R'_0$ whence --; column 16, line 67, for "many" read -- may --; column 18, line 33, for "external" read -- extremal --; same column 18, lines 36 and 37 should appear as shown below instead of as in the patent:

$$a_k = k\lambda_0 \sec \chi_0$$

$$b_k = \left[ b_0^2 - 2k\lambda_0 |x_0| \sec^3 \chi_0 - k^2 \lambda_0^2 \sec^4 \chi_0 \right]^{\frac{1}{2}}$$

Signed and sealed this 27th day of April 1965.

(SEAL)
Attest:

ERNEST W. SWIDER
Attesting Officer

EDWARD J. BRENNER
Commissioner of Patents